(12) United States Patent
Zyskind et al.

(10) Patent No.: US 7,173,756 B2
(45) Date of Patent: Feb. 6, 2007

(54) OPTICAL AMPLIFICATION SYSTEM FOR VARIABLE SPAN LENGTH WDM OPTICAL COMMUNICATION SYSTEMS

(75) Inventors: John Zyskind, Concord, MA (US); Andrew Niall Robinson, Lincoln, MA (US); Seo Yeon Park, Westford, MA (US); Clement Dowd Burton, Westwood, MA (US); John Jacob, Hollis, NH (US); Erik Robert Thoen, Cambridge, MA (US)

(73) Assignee: JDS Uniphase Corporation, Milpitas, CA (US)

(*) Notice: Subject to any disclaimer, the term of this patent is extended or adjusted under 35 U.S.C. 154(b) by 0 days.

(21) Appl. No.: 10/906,382

(22) Filed: Feb. 17, 2005

(65) Prior Publication Data

US 2006/0193035 A1 Aug. 31, 2006

(51) Int. Cl.
*H01S 3/00* (2006.01)
(52) U.S. Cl. .................... 359/337; 359/337.4
(58) Field of Classification Search ................ 359/337, 359/337.4
See application file for complete search history.

(56) References Cited

U.S. PATENT DOCUMENTS

| | | | |
|---|---|---|---|
| 5,430,572 A | 7/1995 | DiGiovanni et al. | 359/341 |
| 5,440,418 A | 8/1995 | Ishimura et al. | 359/177 |
| 5,513,029 A | 4/1996 | Roberts | 359/177 |
| 5,532,864 A | 7/1996 | Alexander et al. | 359/177 |
| 5,615,033 A | 3/1997 | Yoshida et al. | 359/110 |
| 5,859,716 A | 1/1999 | O'Sullivan et al. | 359/110 |
| 5,861,972 A | 1/1999 | Tomooka et al. | 359/177 |
| 5,907,420 A | 5/1999 | Chraplyvy et al. | 359/179 |
| 5,914,794 A | 6/1999 | Fee et al. | 359/110 |
| 6,005,997 A | 12/1999 | Robinson et al. | 385/24 |
| 6,134,047 A | 10/2000 | Flood et al. | 359/341 |
| 6,317,255 B1 | 11/2001 | Fatehi et al. | 359/341.44 |
| 6,335,820 B1 | 1/2002 | Islam | 359/334 |
| 6,344,915 B1 | 2/2002 | Alexander et al. | 359/177 |
| 6,359,708 B1 | 3/2002 | Goel et al. | 359/110 |
| 6,359,725 B1 | 3/2002 | Islam | 359/334 |
| 6,373,621 B1 | 4/2002 | Large et al. | 359/334 |
| 6,377,396 B1 | 4/2002 | Sun et al. | 359/341.42 |
| 6,384,963 B2 | 5/2002 | Ackerman et al. | 359/334 |

(Continued)

OTHER PUBLICATIONS

Robinson, et al., Optical Supervisory Channel For High Span Loss Optical Communication Systems, U.S. Appl. No. 10/905,294, filed Dec. 24, 2004.

*Primary Examiner*—Mark Hellner
(74) *Attorney, Agent, or Firm*—Allen, Dyer, Doppelt, Milbrath & Gilchrist, P.A.

(57) ABSTRACT

An optical communications system includes a plurality of optical fiber spans. An optical loss of one of the plurality of optical fiber spans is different from an optical loss of another one of the plurality of optical fiber spans. At least one of the plurality of optical fiber spans includes an optical loss that is greater than or equal to 35 dB and at least one of the plurality of optical fiber spans includes an optical loss that is less than 30 dB. An optical amplification system includes at least one discrete optical amplifier, at least one distributed optical amplifier, and an optical loss element. The optical amplification system has spectral gain that compensates for substantially all losses experienced by the optical signals propagating in the plurality of optical fiber spans.

41 Claims, 3 Drawing Sheets

U.S. PATENT DOCUMENTS

| | | | |
|---|---|---|---|
| 6,388,801 B1 | 5/2002 | Sugaya et al. | 359/334 |
| 6,433,903 B1 | 8/2002 | Barry et al. | 359/124 |
| 6,433,922 B1 | 8/2002 | Ghera et al. | 359/334 |
| 6,441,951 B1 | 8/2002 | Tanaka et al. | 359/334 |
| 6,466,362 B1 | 10/2002 | Friedrich | 359/334 |
| 6,490,077 B1 * | 12/2002 | Conradi | 359/334 |
| 6,493,133 B1 | 12/2002 | Liang et al. | 359/349 |
| 6,504,630 B1 | 1/2003 | Czarnocha et al. | 359/110 |
| 6,519,082 B2 | 2/2003 | Ghera et al. | 359/341.4 |
| 6,529,315 B2 * | 3/2003 | Bartolini et al. | 359/334 |
| 6,556,346 B1 | 4/2003 | Di Pasquale et al. | 359/341.5 |
| 6,577,437 B2 | 6/2003 | Sugaya et al. | 359/334 |
| 6,583,922 B2 * | 6/2003 | Srikant et al. | 359/337 |
| 6,603,594 B2 | 8/2003 | Islam | 359/334 |
| 6,612,626 B2 | 9/2003 | O'Brien, II | 359/349 |
| 6,621,621 B1 | 9/2003 | Jones et al. | 359/337.11 |
| 6,657,774 B1 | 12/2003 | Evans et al. | 359/334 |
| 6,665,114 B2 | 12/2003 | Benjamin et al. | 359/334 |
| 6,681,079 B1 | 1/2004 | Maroney | 398/15 |
| 6,683,712 B2 | 1/2004 | Tanaka et al. | 359/341.3 |
| 6,687,426 B1 | 2/2004 | May et al. | 385/15 |
| 6,728,028 B1 | 4/2004 | Rodriguez et al. | 359/341.32 |
| 6,771,414 B2 | 8/2004 | Masuda et al. | 359/341.1 |
| 6,810,214 B2 | 10/2004 | Chbat et al. | 398/160 |
| 6,819,479 B1 | 11/2004 | Islam et al. | 359/337 |
| 2002/0054733 A1 | 5/2002 | Kagi et al. | 385/27 |
| 2002/0060839 A1 | 5/2002 | Oh et al. | 359/337.5 |
| 2002/0118442 A1 | 8/2002 | Ghera et al. | 359/334 |
| 2002/0159134 A1 | 10/2002 | Ghera et al. | 359/334 |
| 2002/0167716 A1 | 11/2002 | Yamanaka | 359/334 |
| 2003/0002109 A1 | 1/2003 | Hochberg et al. | 359/152 |
| 2003/0016439 A1 | 1/2003 | Courtois et al. | 359/337.4 |
| 2003/0161031 A1 | 8/2003 | Benjamin et al. | 359/337.4 |
| 2003/0179440 A1 | 9/2003 | Foursa et al. | 359/334 |
| 2004/0033080 A1 | 2/2004 | Eiselt et al. | 398/180 |
| 2004/0047628 A1 | 3/2004 | Passier et al. | 398/15 |
| 2004/0170428 A1 | 9/2004 | Barker et al. | 398/33 |

* cited by examiner

OPTICAL AMPLIFICATION SYSTEM FOR VARIABLE SPAN LENGTH WDM OPTICAL COMMUNICATION SYSTEMS

INTRODUCTION

The section headings used herein are for organizational purposes only and should not to be construed as limiting the subject matter described in the present application.

State-of-the art long-haul optical communication systems often include multiple optical fiber spans. These optical communications systems usually include optical fiber spans that have variable span length because of limitations on where repeater huts can be physically located. It is usually desirable to reduce the number of transmission huts by making the optical fiber spans as long as possible. However, long optical fiber spans have relatively high span loss that can reduce the noise budget of the optical communications system.

BRIEF DESCRIPTION OF THE DRAWINGS

The aspects of this invention may be better understood by referring to the following description in conjunction with the accompanying drawings, in which like numerals indicate like structural elements and features in various figures. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
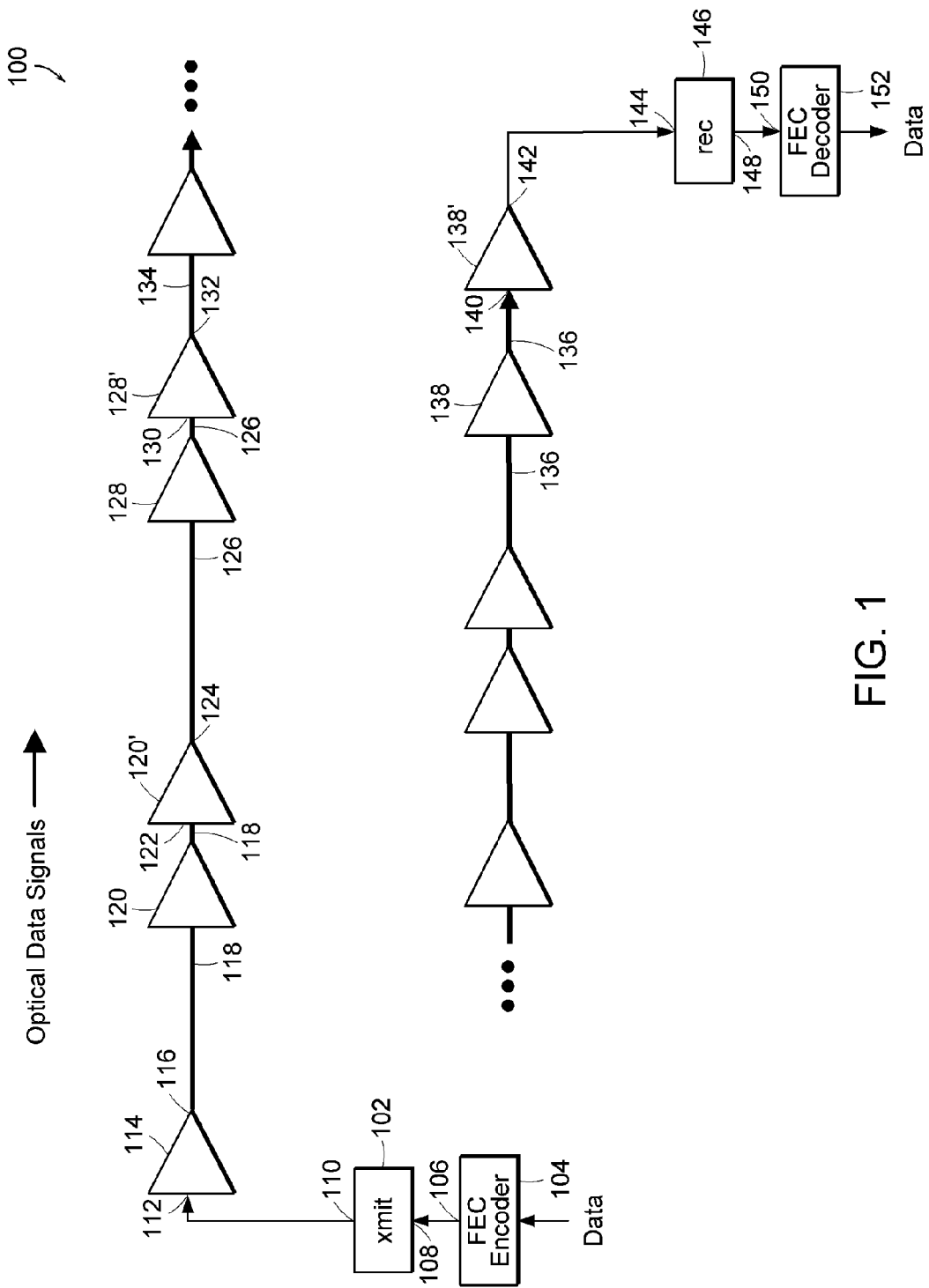
FIG. 1 illustrates an embodiment of an optical communications system that includes a plurality of optical fiber spans and an optical amplification system according to the present invention.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

It should be understood that the individual steps of the methods of the present invention may be performed in any order and/or simultaneously as long as the invention remains operable. Furthermore, it should be understood that the apparatus of the present invention can include any number or all of the described embodiments as long as the invention remains operable.

State-of-the art high-capacity terrestrial optical communications systems use optical fibers to propagate optical data signals because optical fibers have very low optical attenuation and large bandwidth. Optical attenuation is the primary limitation on the propagation distance of such communications systems. Optical attenuation progressively reduces the power and thus the fidelity, or signal-to-noise ratio, of optical signals as they propagate in the optical fiber over relatively large distances.

State-of-the art optical communications systems often include multiple transmission fiber spans. Repeater optical amplifiers are typically placed periodically along the length of the optical fiber to provide optical gain that compensates for optical losses caused by attenuation along the optical fiber. Optical gain of an amplifier is the ratio of the amplifier's optical power output to the amplifier's optical input power. Thus, optical gain is a metric that indicates how much the optical amplifier boosts the input signal power and, therefore, restores the amplitude and preserves the signal-to-noise ratio of the optical signals.

Wavelength Division Multiplexing (WDM) optical communications systems simultaneously transmit many high capacity optical signals over a single optical fiber. State-of-the art repeater optical amplifiers for WDM optical communications systems have wide gain spectra and, therefore, can simultaneously provide gain over the range of wavelengths used in the WDM system. Each optical signal propagating in the WDM optical communications system occupies its own wavelength within the gain spectrum of the optical amplifier.

Typically the optical repeaters are located in telecommunications huts. Telecommunications huts are usually dedicated physical structures that require power and a controlled environment. The cost of the optical repeaters and the construction and maintenance costs associated with the telecommunications huts represent a significant expense for communications service providers. Reducing the number of telecommunications huts in an optical fiber communications system is highly desirable because it would significantly decrease a service provider's cost to transmit optical data and would be more reliable. Consequently, there is a desire to build optical communications systems with longer optical fiber spans that extend the distance between repeater amplifier sites and/or a desire to use fewer repeater amplifiers than are currently being deployed.

Optical repeater amplifiers are typically placed at approximately an 80 km repeater interval along the optical fiber. The optical loss associated with an 80 km optical fiber span can be on order of 25 dB. The amplitude of the optical data signals after about 80 km has been reduced to a level where it must be restored in order to assure usable signals with acceptable noise margins at the end of the link.

Repeater optical amplifiers strengthen the optical signals and thus improve the signal-to-noise ratio of the optical signals. However, optical amplifiers also add noise to the optical data signals. For relatively long optical fiber span lengths, the signal amplitude at the repeater input is relatively small and, consequently, the impairment caused by the optical noise introduced by the optical amplifier is more severe. For this reason, erbium-doped fiber optical amplifier technology will not support optical fiber span lengths or link distances between repeater optical amplifiers that are significantly greater than 80 km. In particular, repeaters for optical fiber spans that are greater than 80 km would require Raman optical amplifiers with lower effective noise figures than are possible with erbium-doped fiber amplifiers.

The noise figure of an amplifier is a figure of merit that provides a measure of the optical noise that is introduced by the amplifier. Noise figure of a discrete optical amplifier in an optical fiber span is defined herein as the ratio of the SNR of an ideal receiver coupled to the output of the optical fiber span without the optical amplifier, to the SNR of the ideal receiver coupled to the output of the optical fiber span after the optical amplifier.

Amplifiers can generate several different types of noise, such as shot noise, thermal noise, and spontaneous emission noise. The noise figure of a discrete optical amplifier is always greater than one because all discrete optical amplifiers generate spontaneous emission noise. The generation of amplified spontaneous emission (ASE) imposes a fundamental limit on the noise figure of an optical amplifier. The noise figure of an optical amplifier cannot be less than 2 in linear units or, equivalently, 3 dB in logarithmic units. This limit is referred to in the art as the so-called quantum limit.

Effective noise figure of a distributed amplifier, such as a distributed Raman amplifier, is defined herein as the noise figure referenced to the input of the optical fiber span minus the loss (in dB) of the optical fiber span. Thus, the effective noise figure of a distributed Raman amplifier is equal to the noise figure of a hypothetical, non-physical discrete amplifier located at the end of the optical fiber span, which would give the same noise performance as that for the optical fiber span including the distributed Raman amplifier.

The effective noise figure of a discrete amplifier coupled to the end of an optical fiber span is equal to the noise figure of the discrete amplifier. This is true because the noise figure of a loss element followed by an optical amplifier is equal to the noise figure of the amplifier plus the loss of the loss element (in dB). The effective noise figure of a distributed amplifier, or of a combined amplifier that includes a distributed amplifier, can be less than the quantum limit of 3 dB and can, in fact, be 0 dB or even less under some conditions. The low noise figure associated with distributed amplification is a major advantage of distributed amplifiers.

There is also a desire to build optical communications systems that can tolerate significant differences in optical fiber span length. Unfortunately, telecommunications huts can not always be placed in the desired locations for many reasons. Restrictions on where telecommunication huts can be located are particularly severe near highly populated areas. Consequently, actual span lengths in currently deployed optical communications systems vary widely. Optical data signals exponentially attenuate with distance. Therefore, optical data signals propagating on the various optical fiber spans can experience vastly different levels of attenuation.

There is also a desire to build optical communications systems that can carry large amounts of information or data. Large amounts of data can be transported by using Wavelength Division Multiplexing (WDM) whereby multiple signal channels, each carried on its own wavelength, are simultaneously transported over the optical fiber and optically amplified at repeater sites. The data capacity of such WDM systems is further increased by using signal channels with relatively high data rates, such as data rates of 10 Gb/s or greater.

Utilizing different optical amplifier designs for the different span lengths occurring in an optical fiber network will result in a relatively high cost, which is undesirable. Thus, repeater optical amplifiers in optical communications systems with widely varying span lengths must be capable of producing a wide range of gains. However, known optical communications systems that are designed to carry high data rate signal channels (10 Gb/s or more) do not tolerate wide variations in optical span length. In these known optical communications systems, the repeater optical amplifiers following lower loss spans typically have relatively high input power levels and, consequently, are operated at lower gain. The effective noise figure for these repeater amplifiers is relatively high because of the relatively high input power level. For example, a variation in loss of only 3–5 dB will cause the effective noise figure to degrade by at least 1 dB for each dB decrease in gain. This degradation in effective noise figure significantly limits the usable dynamic range of the repeater optical amplifiers.

There is also a desire to build WDM optical communications systems that can tolerate significant changes in optical amplifier operating gain without impairing system performance. It is further desired that the ability to tolerate significant changes in optical amplifier operating gain be achieved with a single optical amplifier design to avoid the cost and complication of supporting multiple optical amplifier models. Many WDM optical communications systems include optical amplifiers with amplifier gain spectra that depend strongly on operating gain. The most widely used type of optical amplifier deployed today in optical communications systems is the erbium-doped fiber amplifier (EDFA). The gain spectrum for a particular EDFA is strongly dependent on the operating gain.

Many WDM optical communications systems are designed for repeater optical amplifiers that provide a uniform gain spectral shape for different wavelength channels. However, some WDM optical communications systems are designed for repeater optical amplifiers that have particular target spectral gain shapes. The term "target gain spectral shape" is defined herein as the desired gain shape for a particular application. For example, some WDM optical communications systems are designed for repeater optical amplifiers that have a tilted target gain spectral shape. An example of a tilted gain spectral shape is one where the channel gain depends linearly on the wavelength of the optical data signal with a known or a predetermined slope. Any deviation from the target gain shape in these optical communications systems will degrade system performance.

Known methods of compensating for deviations in the gain spectral shape from the target gain spectral shape degrade the effective noise figure of the repeater optical amplifier. For example, some methods of compensating for deviations in the gain spectral shape use a variable optical attenuator (VOA) to adjust optical loss. However, a VOA can typically provide only a very limited dynamic range. In addition, changes in span loss are often compensated for by including a fixed attenuator outside the amplifier which effectively increases the span loss. However, adding a fixed attenuator increases the noise figure.

In addition, high-speed optical communications systems that propagate signals at 10 Gb/s or greater require dispersion compensation. Known methods of compensating for deviations in the gain spectral shape can only provide a gain dynamic range of 3–5 dB before the effective noise figure penalties become unacceptable. Effective noise figure penalties typically become unacceptable when the degradation in the effective noise figure is greater than 1 dB for each dB that the operating gain is reduced.

In addition, there is also a desire to build optical communications systems that can tolerate additional optical loss that is introduced by dispersion compensating fiber (DCF). Most optical communications systems that operate with high bit-rate channels (10 Gb/s or greater) compensate for chromatic dispersion in the optical fibers by using DCF. Dispersion compensating fiber introduces optical loss that limits the gain and the dynamic range of the optical amplifier. The optical loss introduced by the DCF must be compensated for by introducing additional gain into the system.

An optical fiber communications system of the present invention includes an optical amplification system that simultaneously provides high enough gain and low enough effective noise figure to support optical fiber spans that are significantly greater than 80 km. Also, the optical amplification system has large enough gain dynamic range to support widely varying optical fiber span lengths. Currently deployed optical communications systems typically have dynamic range that supports a 15 to 25 km variation in span lengths for an average span length of 80 km. The optical amplification system of the present invention can support span lengths that are 160 km and can have a dynamic range that supports at least a 50 km variation in span lengths.

In addition, the optical amplification system of the present invention compensates for deviations in the gain spectral shape without significantly degrading the effective noise figure of amplification system. Furthermore, the optical amplification system of the present invention can tolerate additional optical loss that is introduced by a loss element or by dispersion compensating fiber (DCF).

FIG. 1 illustrates an embodiment of an optical communications system 100 that includes a plurality of optical fiber spans and an optical amplification system according to the present invention. The optical communications system 100 includes an optical data transmitter 102 that generates optical data by modulating electronic data onto an optical carrier.

In the embodiment shown in FIG. 1, the optical communications system 100 includes a single optical data transmitter 102. However, it is understood that practical WDM optical communications systems include a plurality of optical data transmitters 102, where each of the plurality of transmitters transmit at a different wavelength. FIG. 1 illustrates a single optical data transmitter 102 in order to more clearly illustrate the invention.

Some aspects of the optical communications system of the present invention are described in connection with forward error correction (FEC). However, it is understood that the optical communications system of the present invention can operate with and without FEC and/or other types of error correction. In some embodiments, the optical communications system 100 includes a FEC encoder 104 having an output 106 that is electrically connected to an input 108 of the optical data transmitter 102. Forward error correction is well known in the art. Forward error correction is used to correct transmission errors and corrupted data and, therefore, can decrease the bit error rate of the optical communications system. Decreasing the bit error rate will extend the loss budget for the optical fiber spans and/or can allow the optical communications system 100 to operate at a higher data rate.

An output 110 of the optical data transmitter 102 is coupled to the optical amplification system and to the plurality of optical fiber spans. The optical amplification system includes a combination of discrete optical amplifiers and distributed optical amplifiers. Numerous types of discrete and distributed optical amplifiers can be used according to the present invention.

For example, the discrete optical amplifiers can be semiconductor optical amplifiers, doped fiber amplifiers, such as erbium-doped fiber amplifiers, and/or discrete Raman amplifiers. The distributed optical amplifiers can be, for example, distributed Raman optical amplifiers that propagate at least one Raman optical pumping signal. The distributed optical amplifiers can also be optical parametric amplifiers.

In the embodiment shown in FIG. 1, the optical amplification system for each of the plurality of optical fiber spans includes a single discrete optical amplifier or lumped element amplifier and a distributed Raman optical amplifier. In one embodiment, the distributed Raman optical amplifier includes an optical pump source that generates a Raman optical pumping signal that includes at least three wavelengths.

The output 110 of the optical data transmitter 102 is coupled to an input 112 of a discrete optical amplifier 114 that is physically located at the transmitter site. An output 116 of the discrete optical amplifier 114 is optically coupled to the first optical fiber span 118. In some embodiments of the invention, the first optical fiber span 118, or at least one of the plurality of optical fiber spans, has an optical loss that is greater than or equal to 35 dB.

The optical amplification system for the first optical fiber span 118 includes a distributed optical amplifier 120 that propagates a Raman optical pumping signal in the first optical fiber span 118. The optical amplification system for the first optical fiber span 118 also includes a discrete optical amplifier 120' having an input 122 that is optically coupled to the first optical fiber span 118.

An output 124 of the discrete optical amplifier 120' is optically coupled to the second optical fiber span 126. The optical loss associated with the second optical fiber span 126 can be different from the optical loss associated with the first optical fiber span 118. Thus, in some embodiments of the invention, at least one of the plurality of optical fiber spans has an optical loss that is different from the optical loss associated with of another one of the plurality of optical fiber spans.

The optical amplification system for the second optical fiber span 126 includes a distributed Raman optical amplifier 128 that propagates a Raman optical pumping signal in the second optical fiber span 126. The optical amplification system for the second optical fiber span 126 also includes a discrete optical amplifier 128' having an input 130 that is optically coupled to the second optical fiber span 126.

An output 132 of the discrete optical amplifier 128' is optically coupled to the next (third) optical fiber span 134. The optical amplification system for the next optical fiber span 134 includes the distributed optical amplifier and the discrete optical amplifier that are described in connection with the first and the second optical fiber spans 118, 126.

The optical amplification system is repeated for each of the N optical fiber spans. The optical amplification system for the $N^{th}$ optical fiber span 136 includes a distributed Raman optical amplifier 138 that propagates a Raman optical pumping signal in the $N^{th}$ optical fiber span 136. The optical amplification system for the $N^{th}$ optical fiber span 126 also includes a discrete optical amplifier 138' having an input 140 that is optically coupled to the $N^{th}$ optical fiber span 136.

An output 142 of the $N^{th}$ discrete optical amplifier 138' is optically coupled to an input 144 of an optical receiver 146. In the embodiment shown in FIG. 1, only one optical receiver 146 is shown. However, it is understood that practical WDM optical communications systems include a plurality of optical receivers, where each of the plurality of optical receivers receive optical data signals at a different wavelength.

In embodiments including FEC, an output 148 of the optical receiver 146 is electrically coupled to an input 150 of a FEC decoder 152. The FEC decoder 152 decodes the encoded optical signals and corrects transmission errors in the optical signals. In one embodiment, the FEC encoder 104 performs Reed-Solomon encoding and the FEC decoder 152 performs Reed-Solomon decoding. Reed-Solomon encoding and decoding is well known in the art. In other embodiments, numerous other types of coding schemes known in the art are used.

Figure 2:
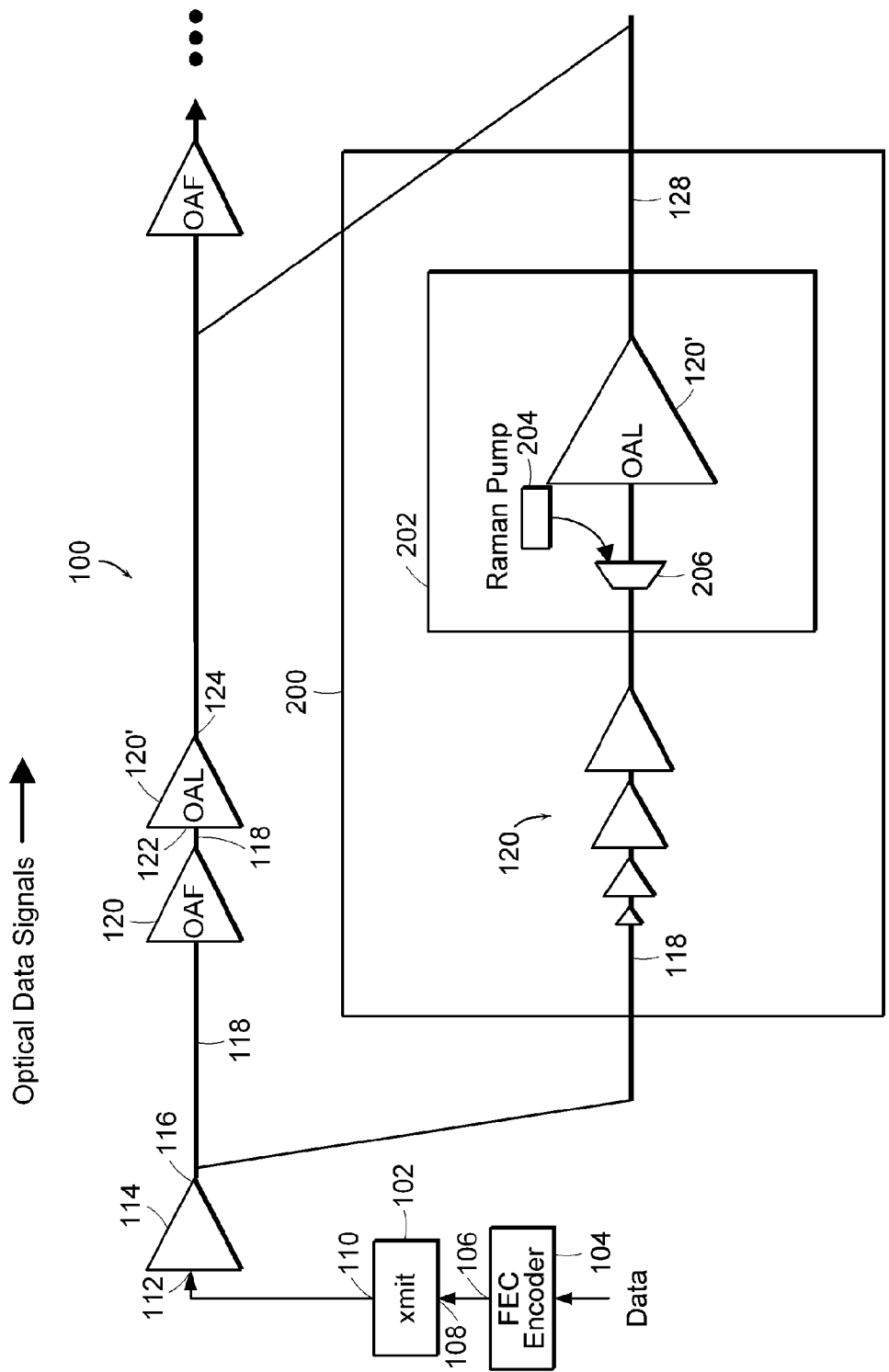
FIG. 2 illustrates an exemplary optical fiber span of the optical communications system of FIG. 1.

FIG. 2 illustrates an exemplary optical fiber span 200 of the optical communications system 100 of FIG. 1. The optical fiber span 200 includes a more detailed view of the optical amplification system in the first optical fiber span 118. The distributed optical amplifier 120 is a distributed Raman optical fiber amplifier that is shown as several optical amplifiers with increasing size to indicate that the amplification is distributed.

The optical fiber span 200 also includes a repeater site 202 that is often physically located in a telecommunications hut. The repeater site 202 includes the discrete optical amplifier 120'. The repeater site 202 also includes a Raman optical pump source 204 that is optically coupled into the first optical fiber span 118 with an optical coupler 206.

The optical coupler 206 directs the Raman optical pumping signals generated by the Raman optical pump source 204 to the first distributed Raman optical fiber amplifier 120 in a direction that is opposite to the optical data signals (i.e. a counter-propagating direction). It is understood that the distributed Raman optical fiber amplifier used in the optical amplification system of the present invention can be pumped in the co-propagating direction and also can be pumping in both the counter-propagating and the co-propagating direction. In some embodiments, the Raman optical pump source 204 generates a Raman optical pumping signals that comprises at least three different wavelengths.

In operation, the optical data transmitter 102 generates optical data signals. In some embodiments, the FEC encoder 104 encodes the optical data signals with FEC signals. The optical data signals are propagated through the optical communications system 100 that includes the plurality of optical fiber spans where at least one of the plurality of optical fiber spans has a loss that is greater than or equal to 35 dB. In some embodiments, the optical loss of at least one optical fiber span is different from the optical loss of another of the optical fiber spans.

The optical data signals propagating through each of the plurality of optical fiber spans are amplified by the optical amplification system including the discrete optical amplifiers 120', 128', 138'. The optical amplification system including the discrete amplifiers 120', 128', 138' and the distributed optical amplifiers 120, 128, 138 have a combined spectral gain over the wavelengths propagating in the optical fiber spans that compensates for substantially all losses experienced by optical signals propagating in the plurality of optical fiber spans.

In some embodiments, the effective noise figure of at least one of the optical amplification systems does not exceed 3 dB at maximum gain conditions. Also, in some embodiments, the optical gain of at least one of the optical amplification systems has a gain dynamic range that is greater than or equal to 8 dB and maximum gain that is equal to the gain dynamic range. Also, in some embodiments, the gain tilt induced by the Raman optical pumping signals in the distributed Raman optical amplifiers 120, 128 and 138 is adjusted to achieve a predetermined gain dynamic range.

The receiver 146 receives the transmitted optical data signals. It is understood that in practical WDM optical communications systems the transmitted optical data signals are received by a plurality of optical receivers (not shown in FIG. 2), where each receiver receives a particular wavelength channel. In embodiments including FEC, the receiver 146 receives optical data signals that are encoded with FEC. In these embodiments, the FEC decoder 148 decodes the encoded optical data signals to correct transmission errors and to reduce the signal-to-noise of the optical data signals.

In some embodiments, dispersion compensation is used to reduce pulse broadening and the resulting intersymbol interference (ISI) that is caused by chromatic dispersion in the plurality of optical fiber spans. In one embodiment, dispersion compensation is accomplished by using dispersion compensating fiber (DCF). However, DCF typically has relatively high optical loss, which can be on order of 13 dB or more depending on the span length and type of optical transmission fiber being compensated.

In these embodiments, the combined spectral gain of the optical amplification systems over the wavelengths propagating in the plurality of optical fiber spans compensates for substantially all losses experienced by optical signals propagating in the plurality of optical fiber spans that are caused by the dispersion compensation. The DCF can be Raman optical pumped to compensate for at least some of the loss associated with the DCF. Alternatively, additional gain can be provided with the discrete optical amplifier and/or the distributed optical amplifier to compensate for the DCF loss.

Figure 3:
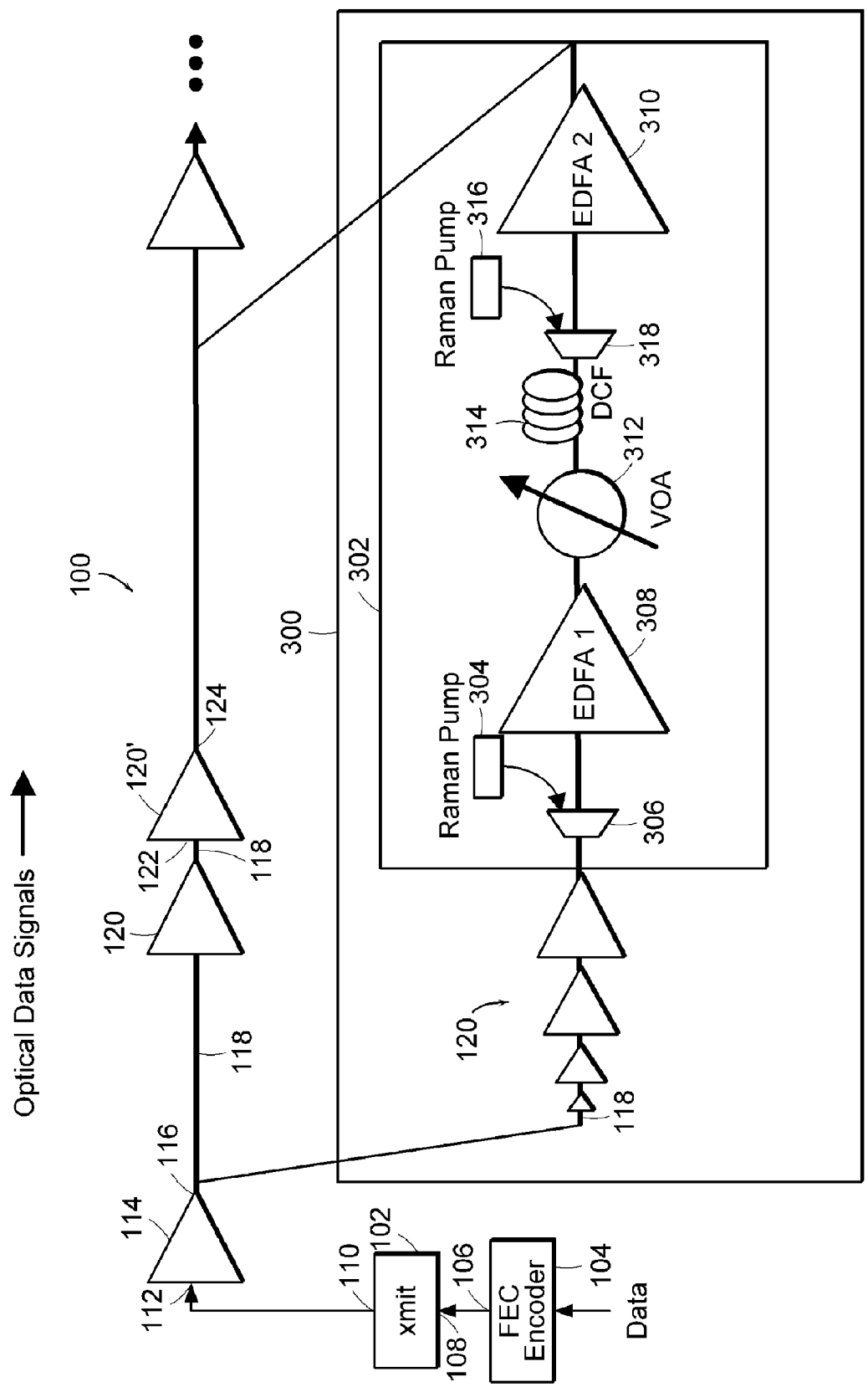
FIG. 3 illustrates an exemplary optical fiber span of the optical communications system of FIG. 1 that includes dispersion compensation and optical attenuation.

FIG. 3 illustrates an exemplary optical fiber span 300 of the optical communications system 100 of FIG. 1 that includes dispersion compensation and optical attenuation. The optical fiber span 300 is similar to the optical fiber span 200 that was described in connection with FIG. 2. However, the optical fiber span 300 further includes a dispersion compensator and an optical attenuator.

The optical fiber span 300 includes a more detailed view of the optical amplification system in the first optical span 118. The optical fiber span 300 illustrates the distributed Raman optical fiber amplifier 120 as several optical amplifiers with increasing size to indicate that the amplification is distributed. The optical fiber span 300 also includes a repeater site 302 that is often physically located in a telecommunications hut.

The repeater site 302 comprises a hybrid Raman-EDFA amplifier system. The repeater site 302 includes a first Raman optical pump source 304 that is optically coupled into the first optical fiber span 118 with a wavelength selective optical coupler 306. The wavelength selective optical coupler 306 directs the Raman optical pumping signals generated by the Raman optical pump source 304 to the first distributed Raman optical fiber amplifier 120 in a direction that is opposite to the optical data signals (i.e. a counter-propagating direction). It is understood that the distributed Raman optical fiber amplifier used in the optical amplification system of the present invention can be pumped in the co-propagating direction and also can be pumped in both the counter-propagating and the co-propagating direction. In some embodiments, the Raman optical pump source 304 generates a Raman optical pumping signals that comprises at least three different wavelengths.

The hybrid Raman-EDFA amplifier system in the optical fiber span 300 also includes a first EDFA 308 and a second EDFA 310 that are optically coupled into the optical fiber span 300. A variable optical attenuator (VOA) 312 is optically coupled between the first EDFA 308 and a second EDFA 310. The VOA 312 provides mid-stage optical attenuation that can be used to adjust the overall gain of the amplification system without altering the gain of the EDFAs 308, 310.

The repeater site also includes dispersion compensating fiber that compensates for chromatic dispersion. In the embodiment shown in FIG. 3, the VOA 312 is optically coupled to the second EDFA 310 with DCF 314. A second Raman optical pump source 316 is optically coupled into the DCF 314 with a wavelength selective optical coupler 318. The wavelength selective optical coupler 318 directs the Raman optical pumping signals generated by the second Raman optical pump source 316 to the DCF 314 in a direction that is opposite to the optical data signals (i.e. a counter-propagating direction). It is understood that the DCF 314 can be pumped in the co-propagating direction and also can be pumped in both the counter-propagating and the co-propagating direction.

The DCF 314 adds significant optical loss to the first optical fiber span 118, which significantly adds to the mid stage optical attenuation. In many prior art systems optical loss between the two EDFA stages that is caused by the DCF 314 and the VOA 312 becomes significant compared to the gain of the optical amplification system when the optical gain is adjusted by 3 to 5 dB from its maximum value, which corresponds to the minimum loss of the VOA. When the optical loss becomes significant compared to the gain of the optical fiber span, the combined noise figure of the optical amplification system begins to increase very rapidly with increasing VOA 312 loss. The rapidly increasing noise figure can significantly limit the dynamic range of the optical amplification system of repeater site 302.

It has been discovered that when the span losses are very high and the mid-stage losses from the VOA 312 and/or DCF 314 are made relatively low by Raman optical pumping of the DCF, or by using low loss DCF, then the gain of the optical amplification system of the repeater site 302 can be adjusted over a very wide range compared with known optical amplification systems before the combined effective noise figure of the optical amplification system of repeater site 302 rises to an unacceptably high level. This assumes that the optical amplification system has high enough gain to compensate for the optical span loss. In fact, it has been found that the gain of the optical amplification system of repeater site 302 can be adjusted over a range of about 15 dB or more in contrast to the 3 to 5 dB range of known systems.

Under operating conditions where the launch power of the optical signals into the first optical fiber span 118 is higher than the sensitivity of the optical receiver 146, the optical amplification system must provide enough gain to compensate for the optical losses associated with all of the optical fiber spans, including optical losses associated with the dispersion compensation, minus the defect of the launch power (in dB) minus the receiver sensitivity (in dB). For example, an optical communications system having 5 spans with an average optical loss per span of 30 dB, a total aggregate span loss that is on order of 150 dB, and a receiver sensitivity that is 20 dB below the optical launch power, would require the amplification system to compensate for 150 dB of loss minus the 20 dB. Such an amplification system would compensate for "substantially all losses" as defined herein.

Similarly, as another example, an optical communications system having 10 spans with an average optical loss of 30 dB, a total aggregate span loss that is on order of 300 dB, and a receiver sensitivity that is 20 dB below the optical launch power, would require the optical amplification system to compensate for 300 dB of loss minus the 20 dB. Such an amplification system would compensate for "substantially all losses" as defined herein.

The optical amplification system illustrated in FIG. 3 provides much versatility. The optical amplification system of repeater site 302 can be adjusted to provide a desired target gain shape for a particular optical fiber span length. For example, for a relatively short optical fiber span length, the optical amplification system of repeater site 302 can be adjusted to have relatively low gain with the desired spectral shape. For a relatively long span length, optical amplification system of repeater site 302 can be adjusted to have a relatively high gain with the desired spectral shape.

For many applications, the optical amplification system of repeater site 302 is designed to produce a target gain spectral shape that is substantially flat. However, for some particular applications, the optical amplification system of repeater site 302 is designed to produce a specific non-flat gain spectral shape. In some particular applications, it is desirable to produce amplifier gain spectral shapes that are tilted. For example, it is sometimes desirable to introduce tilt into the gain spectrum to compensate for tilt that is produced by the presence of Stimulated Raman Scattering (SRS) between the signal channels.

The gain of the first EDFA 308 and the second EDFA 310 may be changed in order for the optical amplification system to achieve a desired total gain. When the gain of the EDFAs 308, 310 is changed, the shape of the gain profile changes. In fact, the shape of the gain profile typically tilts by about ¾ to 1 dB for each dB change in the gain.

The gain tilt that is introduced when the gain of the erbium-doped fiber in the EDFAs 308, 310 are changed can be reduced by adjusting the VOA 312. Adjusting the VOA 312 will adjust the mid-stage optical attenuation that will adjust the overall gain without altering the gain of the erbium-doped fiber in the EDFAs 308, 310. Thus, the VOA 312 can be adjusted to control the gain of the optical amplification system of the repeater site 302 over a wide range of gains while maintaining the desired shape of the gain spectrum of the optical amplification system of repeater site 302.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. An optical amplifier for variable length optical fiber spans, the optical amplifier comprising:
    a) at least one discrete optical amplifier that is coupled into an optical fiber span that has a predetermined optical loss that is greater than or equal to 35 dB;
    b) a distributed optical amplifier that is coupled in the optical fiber span, a combined spectral gain of the at least one discrete optical amplifier and the distributed optical amplifier compensating for substantially all losses experienced by optical signals propagating in the optical fiber span, a gain of at least one of the at least one discrete optical amplifier and the distributed optical amplifier being adjusted to cause an increase in an associated effective noise figure that is less than 8 dB when the gain is reduce by 8 dB; and
    c) an optical loss element that is coupled into the optical fiber span, the optical loss element introducing an optical loss into the optical fiber span that achieves a desired combined gain dynamic range and associated effective noise figure for the predetermined optical loss of the optical fiber span.

2. The optical amplifier of claim 1 wherein the gain of the at least one discrete optical amplifier and the distributed optical amplifier is adjusted to cause an increase in the associated effective noise figure that is less than 4 dB when the gain is reduced by 4 dB.

3. The optical amplifier of claim 1 wherein the at least one discrete optical amplifier comprises a discrete Raman amplifier.

4. The optical amplifier of claim 1 wherein the at least one discrete optical amplifier comprises a semiconductor optical fiber amplifier.

5. The optical amplifier of claim 1 wherein the at least one discrete optical amplifier comprises a doped optical fiber amplifier.

6. The optical amplifier of claim 1 wherein the distributed optical amplifier comprises a distributed Raman amplifier.

7. The optical amplifier of claim 1 further comprising a second discrete optical amplifier that is coupled into the optical fiber span.

8. The optical amplifier of claim 1 further comprising a dispersion compensator that is optically coupled into the optical fiber span.

9. The optical amplifier of claim 8 wherein the dispersion compensator comprises a dispersion compensating optical fiber.

10. The optical amplifier of claim 9 further comprising a Raman optical pumping source that is optically coupled into the dispersion compensating optical fiber.

11. A method of amplifying optical signals propagating in variable length optical fiber spans, the method comprising:
   a) amplifying optical signals propagating in an optical fiber span having an optical loss that is greater than or equal to 35 dB with at least one discrete optical amplifier and at least one distributed optical amplifier, the at least one discrete optical amplifier and the at least one distributed optical amplifier having a combined spectral gain with an associated combined effective noise figure that compensates for substantially all losses experienced by the optical signals propagating in an optical fiber span with a predetermined optical loss; and
   b) adjusting at least one of the combined spectral gain and an optical loss of an optical loss element coupled into the optical fiber span to cause an increase in the associated combined effective noise figure to be less than 8 dB when the gain is reduce by 8 dB.

12. The method of claim 11 further comprising adjusting at least one of the combined spectral gain and the optical loss of the optical loss element coupled into the optical fiber span to cause the increase in the associated combined effective noise figure to be less than 4 dB when the gain is reduce by 4 dB.

13. The method of claim 11 wherein the adjusting the at least one of the combined spectral gain and the optical loss comprises adjusting the optical loss of the optical loss element to increase the combined gain dynamic range for a predetermined combined noise figure and the predetermined optical loss of the optical fiber span.

14. The method of claim 11 further comprising adjusting gain tilt induced by a Raman pumping signal used to pump the distributed optical amplifier in order to achieve the desired combined gain dynamic range.

15. The method of claim 11 further comprising compensating for at least some chromatic dispersion in the optical fiber span.

16. The method of claim 15 wherein the combined spectral gain compensates for substantially all losses resulting from the chromatic dispersion compensation.

17. The method of claim 11 further comprising encoding the optical signals with a forward error correction signal and decoding received optical signals, thereby correcting transmission errors in the received optical data signal and reducing signal-to-noise requirements of the optical fiber span.

18. An optical communications system comprising:
   a) a plurality of optical fiber spans, an optical loss of one of the plurality of optical fiber spans being different from an optical loss of another one of the plurality of optical fiber spans, at least one of the plurality of optical fiber spans having an optical loss that is greater than or equal to 35 dB and at least one of the plurality of optical fiber spans having an optical loss that is less than 30 dB; and
   b) an optical amplification system that is coupled into one of the plurality of optical fiber spans, the optical amplification system comprising at least one discrete optical amplifier, at least one distributed optical amplifier, and an optical loss element, the optical amplification system having spectral gain that compensates for substantially all losses experienced by the optical signals propagating in the plurality of optical fiber spans.

19. The optical communications system of claim 18 wherein the at least one discrete optical amplifier comprises at least one doped optical fiber amplifier.

20. The optical communications system of claim 18 wherein the at least one distributed optical amplifier comprises at least one distributed Raman amplifier.

21. The optical communications system of claim 18 wherein the at least one discrete optical amplifier comprises at least one discrete Raman amplifier.

22. The optical communications system of claim 18 wherein the at least one discrete optical amplifier comprises at least one semiconductor optical fiber amplifier.

23. The optical communications system of claim 18 wherein the optical loss element comprises a dispersion compensating optical fiber.

24. The optical communications system of claim 18 wherein the optical loss element comprises a variable optical attenuator.

25. The optical communications system of claim 18 wherein the optical loss element introduces an optical loss that achieves a desired combined gain dynamic range and a desired combined noise figure of the at least one discrete optical amplifier and the at least one distributed optical amplifier.

26. The optical communications system of claim 18 further comprising a dispersion compensator.

27. The optical communications system of claim 26 wherein the optical amplification system has spectral gain that compensates for substantially all optical losses that are caused by the dispersion compensator.

28. The optical communications system of claim 18 further comprising a forward error correction encoder that adds forward-error correction signals to the optical data signals propagating in the plurality of optical fiber spans and a forward-error correction decoder that corrects transmission errors in received optical data signals.

29. The optical communications system of claim 18 wherein an effective noise figure of the optical amplification system does not exceed 3 dB at maximum gain conditions.

30. The optical communications system of claim 18 wherein the optical amplification system has a gain dynamic range that is greater than or equal to 8 dB.

31. The optical communications system of claim 18 wherein an effective noise figure of the optical amplification system degrades by less than 4 dB when the operating gain is reduced by 4 dB from maximum gain.

32. The optical communications system of claim 18 wherein an effective noise figure of the optical amplification system degrades by less than 8 dB when the operating gain is reduced by 8 dB from maximum gain.

33. The optical communications system of claim 18 wherein the optical amplification system comprises a spectral gain shape that is within 3 dB of a target spectral gain shape over an entire range of operating gains.

34. An optical communications system comprising:
a) a plurality of optical fiber spans, wherein an optical loss of one of the plurality of optical fiber spans is different from an optical loss of another one of the plurality of optical fiber spans and at least one of the plurality of optical fiber spans has a loss that is greater than or equal to 35 dB;
b) a dispersion compensator that is coupled into an optical fiber span of the plurality of optical fiber spans, the dispersion compensator compensating for chromatic dispersion effects in the optical fiber span;
c) at least one discrete optical amplifier that is coupled into the optical fiber span, the at least one discrete optical amplifier amplifying optical data signals propagating in the optical fiber span; and
d) at least one distributed optical fiber amplifier that is coupled into the optical fiber span, the at least one discrete optical amplifier and the at least one distributed optical fiber amplifier having a combined spectral gain that compensates for substantially all losses experienced by the optical signals propagating in the optical fiber span.

35. The optical communications system of claim 34 wherein the at least one distributed optical fiber amplifier comprises a distributed Raman amplifier.

36. The optical communications system of claim 34 wherein a Raman optical pumping signal that optically pumps the at least one distributed Raman amplifier comprises at least three Raman pump wavelengths.

37. The optical communications system of claim 34 wherein the at least one distributed optical fiber amplifier comprises an optical parametric amplifier.

38. The optical communications system of claim 34 wherein the at least one discrete optical amplifier comprises a doped optical fiber amplifier.

39. The optical communications system of claim 38 wherein the doped optical fiber amplifier comprises an EDFA.

40. The optical communications system of claim 34 wherein the at least one discrete optical amplifier comprises a semiconductor optical amplifier.

41. The optical communications system of claim 34 wherein the at least one discrete optical amplifier comprises a discrete Raman optical amplifier.

* * * * *